United States Patent [19]
Barenyi

[11] 3,897,967
[45] Aug. 5, 1975

[54] PROTECTIVE STRIP FOR MOTOR VEHICLES, ESPECIALLY PASSENGER MOTOR VEHICLES

[75] Inventor: Bela Barenyi, Maichingen, Germany

[73] Assignee: Daimler-Benz Aktiengesellschaft, Germany

[22] Filed: Mar. 9, 1973

[21] Appl. No.: 339,878

[30] Foreign Application Priority Data
Mar. 9, 1972 Germany............... 2211363

[52] U.S. Cl............ 293/1; 16/86 R; 24/73 HS; 52/718; 114/219; 293/62; 293/71 R; 293/96; 293/99
[51] Int. Cl..... B60j 11/00; B60r 19/08; E04f 19/02
[58] Field of Search........ 16/86, 86 A, 86 R; 24/73, 24/73 HS; 114/219; 293/71 P, 88, 1, 62, 71 R, 96, 99; 52/716, 717, 718

[56] References Cited
UNITED STATES PATENTS

| | | | |
|---|---|---|---|
| 2,585,438 | 2/1952 | Clingman | 16/86 |
| 2,986,419 | 5/1961 | Barenyi | 293/62 |
| 3,019,758 | 2/1962 | Erkert | 114/219 |
| 3,122,804 | 3/1964 | Stawinski | 24/73 |
| 3,251,103 | 5/1966 | Saut | 24/73 |
| 3,441,305 | 4/1969 | Trammell, Jr. | 293/1 |
| 3,517,473 | 6/1970 | Kistner et al. | 293/1 |
| 3,572,799 | 3/1971 | Truesdell | 293/62 X |
| 3,606,431 | 9/1971 | Kunevicius | 293/1 |

FOREIGN PATENTS OR APPLICATIONS

| | | | |
|---|---|---|---|
| 858,506 | 12/1952 | Germany | 293/62 |

Primary Examiner—M. Henson Wood, Jr.
Assistant Examiner—Howard Beltran
Attorney, Agent, or Firm—Craig & Antonelli

[57] ABSTRACT

A protective strip for motor vehicles, especially for passenger motor vehicles, which includes an elastic profile adapted to be inserted into a recess or indentation provided at the vehicle body covering; the elastic profile is provided on its side facing the vehicle body covering with a longitudinal slot into which is inserted a retaining profile which is provided with fastening elements engaging in bores of the vehicle body covering to thereby pull the elastic profile into the recess or indentation of the vehicle body covering when assembled.

18 Claims, 8 Drawing Figures

3,897,967

PROTECTIVE STRIP FOR MOTOR VEHICLES, ESPECIALLY PASSENGER MOTOR VEHICLES

The present invention relates to a protective strip for motor vehicles, especially for passenger motor vehicles, which includes an elastic profile adapted to be inserted into a recess of the vehicle body covering and provided on its side facing the vehicle body covering with a longitudinal slot into which is installed a retaining or mounting profile.

Customarily, protective strips which consist of a profile made of rubber or rubber-like elastic material, are mounted on the flush continuous outer side of the vehicle body covering. In this case, additional reinforcing profiles of metal or the like have to be provided which assure that also at higher temperatures and after longer periods of operation, the protective strips extend in the original form and shape. The reinforcing profiles, for the most part, are mounted externally as it entails very great difficulties in the manufacture to thread or insert a reinforcing profile of metal on the inside of a protective strip made of an elastic profile. The externally mounted reinforcing profiles are then damaged when the function of the protective strip is to be utilized. Additionally, they reduce the elastic effect of the protective strip.

These disadvantages are avoided by a prior art protective strip of the aforementioned type (German Pat. No. 858,506) in which the elastic profile is inserted into a groove-like recess of the vehicle body covering. This groove-like recess which reinforces the vehicle body covering within this area, assures an adequate guidance of the elastic profile so that additional reinforcing profiles can be dispensed with. A bulge-shaped protective strip is provided with this prior art type of construction which includes on its side facing the recess a slot that leads to an aperture on the inside of the protective strip disposed perpendicularly thereto. This aperture accommodates a steel band which serves as retaining profile and is to enable a fastening at the vehicle body covering which anchors the elastic profile detachably from the outside without fastening means entering the vehicle body. Difficulties result in this type of construction if the protective strip is to be interrupted, for example, within the area of the vehicle side doors.

The present inventioon is concerned with the task to provide a protective strip of the aforementioned type which excels by a simple manufacture and simple assembly. The present invention essentially consists in that the retaining profile is provided with fastening elements engaging in bores of the vehicle body covering and draws the elastic profile into the recess.

In an advantageous embodiment of the present invention, the retaining profile consists of a bar or strip approximately U-shaped in cross section, whose outwardly pointing leg portions extend parallel to the upper and lower walls of the inwardly tapering recess. With the aid of this retaining profile, the elastic profile is tightened along large surfaces to the walls of the recesses or is clamped to the same so that a safe and accurately rectilinear fastening is obtained. It is advantageous if the bar or strip of the retaining profile is made of a springy material. This bar or strip consisting of metal or synthetic plastic material does not require any excessively high tolerances whereas a uniform abutment pressure is nonetheless assured in all areas.

In a structurally advantageous embodiment of the present invention, clips serve as fastening elements which are outwardly extended beyond the legs of the bar or strip of the retaining profile. These clips can be detected easily through the elastic profile and can be pushed-in into the bores of the vehicle body covering. Also these clips realize together with the retaining profile such a safe and reliable fastening of the protective strip that this protective strip does not become disengaged or detached from the vehicle body covering during an accident or the like. The danger is eliminated thereby that the protective strip protrudes lance-like from the vehicle after a slight collision and thus represents a considerable danger to persons such as pedestrians or passers-by-disposed outside of the vehicle.

If the bar or strip of the retaining profile is made of synthetic resinous material, then it is favorable for reasons of manufacture and assembly if the fastening elements are made in one piece with the bar.

In order to align the protective strip in its longitudinal direction and to fix the same, provision is made according to a further feature of the present invention that at least individual fastening elements engage in bores of the elastic profile.

According to a further feature of the present invention, end portions of elastic material running out in the surface of the vehicle body covering adjoin the elastic profile, into which is inserted at least one outwardly extended fastening element. Also these end portions permit an alignment of the remaining elastic profile in its longitudinal direction. The use of the end portions permits the use of extruded profiles with such protective strips.

In order to reduce the corrosion danger at the vehicle body covering within the area of the protective strip, it is advantageous if the elastic profile surrounds the recess of the vehicle body covering above and below with sealing lips.

In order to increase the elasticity of the protective strip and simultaneously to economize material, it is appropriate if the elastic profile is provided with a hollow space extending in the longitudinal direction within the area adjoining the slot.

Accordingly, it is an object of the present invention to provide a protective strip for motor vehicles, especially for passenger motor vehicles which avoids by simple means the aforementioned shortcomings and drawbacks encountered in the prior art.

Another object of the present invention resides in a protective strip for motor vehicles which assures the preservation of the original configuration of the protective strip also at higher temperatures and/or after longer periods of operation.

A further object of the present invention resides in a protective strip for motor vehicles which minimizes if not eliminates the danger of damages to the protective strip when used for its intended purposes under normal conditions of use.

Still a further object of the present invention resides in a protective strip for motor vehicles which retains an elastic effect under all conditions, yet permits its use also with vehicle parts that are relatively movable with respect to one another.

Another object of the present invention resides in a protective strip of the aforementioned type which can be manufactured and installed in a simple manner.

A further object of the present invention resides in a protective strip for motor vehicles which permits a safe and accurately rectilinear fastening yet avoids the need for excessively high tolerances.

Another object of the present invention resides in a protective strip which minimizes the dangers to other participants in the traffic such as pedestrians after the protective strip has been damaged due to a collision.

Still another object of the present invention resides in a protective strip of the type described above which permits an economy in material with simultaneous increase in the elasticity thereof, while simultaneously reducing the corrosion danger at the vehicle body covering portions where the protective strip is installed.

These and further objects, features and advantages of the present invention will become more apparent from the following description when taken in connection with the accompanying drawing which shows, for purposes of illustration only, several embodiments in accordance with the present invention, and wherein.

Figure 1:
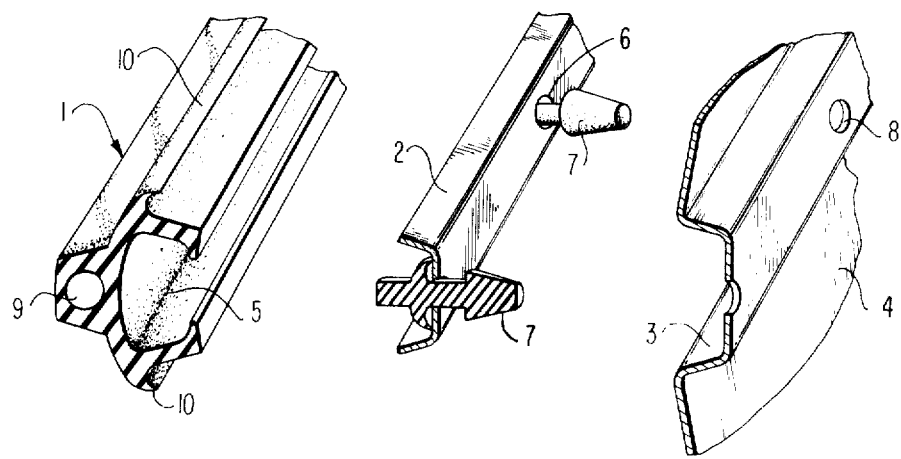
FIG. 1 is a partial exploded perspective view of a protective strip according to the present invention with the individual parts thereof in cross section.
Figure 2:
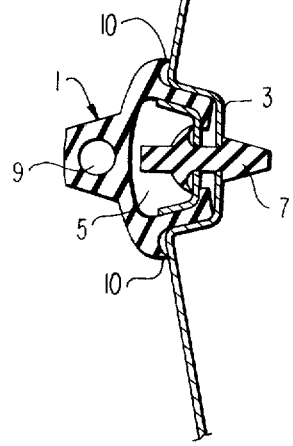
FIG. 2 is a vertical cross-sectional view through the protective strip of FIG. 1.
Figure 1A:
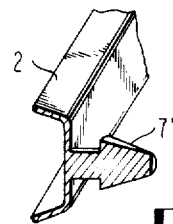
FIG. 1a is a partial vertical cross-sectional perspective view of an individual component part of the protective strip in accordance with the present invention.

Referring now to the drawing wherein like reference numerals are used throughout the various views to designate like parts, and more particularly to FIGS. 1 and 2, the protective strip illustrated in these two figures consists of an elastic profile generally designated by reference numeral 1 and of a retaining or mounting profile 2, by means of which it is adapted to be secured in a recess or indentation 3 of a vehicle body covering 4. The elastic profile 1 consists of rubber or rubber-like material or of any other soft elastic synthetic plastic material. It includes C-shaped slot on its side facing the recess 3, into which is installed the retaining profile 2. The retaining profile 2 which is made of synthetic plastic material or of metal is constructed as bar or strip with a U-shaped cross section. In its dimensions, the retaining profile 2 corresponds to the internal dimensions of the slot 5. The retaining profile 2 is provided with bores 6 into which are inserted the clips 7 that can be pushed-in into the bores 8 of the indentation or recess 3 of the vehicle body covering 4. The clips 7 are normally inserted or threaded into the retaining profile 2. However, it is also possible, especially when the retaining profile 2 is made of synthetic resinous material, to make the clips 7 in one piece with the retaining profile 2 as is indicated FIG. 1a.

As can be seen from FIG. 2, the elastic profile 1 is drawn into the indentation or recess 3 by the retaining profile 2. The outwardly pointing leg portions of the reaining profile 2 which extend parallel to the inwardly tapering walls of the recess 3, thereby press the upper and lower portions of the profile 1 delimiting the slot 5 against the walls of the recess 3. The retaining profile 2 is disposed in the assembled condition at a distance to the bottom of the indentation 3. The clips 7 pull the retaining profile 2 in the direction toward the bottom of the recess 3. Especially when the retaining profile 2 consists of an elastic material, the outer webs of the elastic profile 1 are pressed uniformly against the walls of the recess 3. By reason of the fact that the dove-tail-like or C-shaped slot 5 of the elastic profile 1 partially extends still about the retaining profile 2, in addition to the force-locking connection, a form-locking connection is also obtained. Altogether, a very safe mounting of the elastic profile 1 results which also in case of a deformation of the body covering 4, is not immediately loosened, i.e., does not necessarily become detached immediately. The danger is avoided thereby that the protective strip becomes detached from the vehicle body covering 4 and then protrudes lance-like from the vehicle. It is thereby favorable that the leg portions of the retaining profile 2 do not project or project only slightly beyond the outer contour of the vehicle body covering 4 in the installed condition.

The clips 7 are extended outwardly beyond the leg portions of the retaining profile 3. They can be detected during the assembly through the elastic profile 1 and then can be pushed-in into the bores 8 of the recess 3 simply under slight deformation of the elastic profile 1.

The elastic profile 1 is provided on its outer side with an approximately trapezoidally shaped bulge or bead in which is provided a hollow space 9 extending in the longitudinal direction of the elastic profile 1. The elastic profile 1 overlaps the edges of the recess 3 in the upward and downward direction by means of sealing lips 10 which prevent the penetration of rain water or dirt or the like. Water drainage grooves are disposed therebehind.

Figure 3:
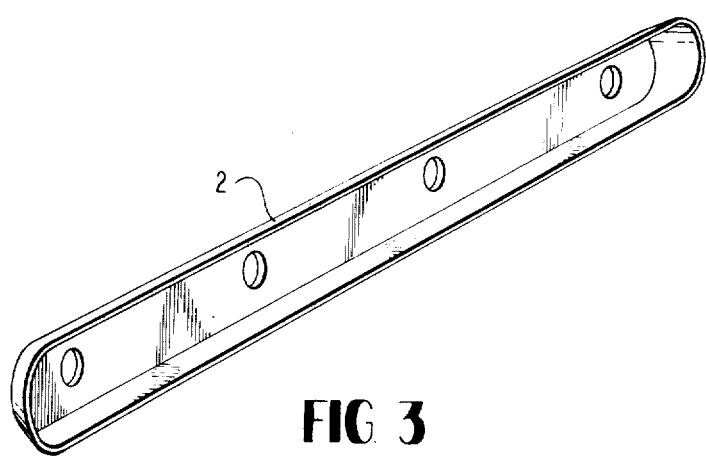
FIG. 3 is a perspective view of an individual component part of the protective strip according to FIGS. 1 and 2.

In FIG. 3 the retaining profile 2 which is made of metal or synthetic plastic material is illustrated by itself. It can be seen from this figure that the leg portions of the retaining profile 2 extend annularly shaped so that a trough-like bar or strip is formed which is centered within the recess 3 also in the longitudinal direction.

Figure 4:
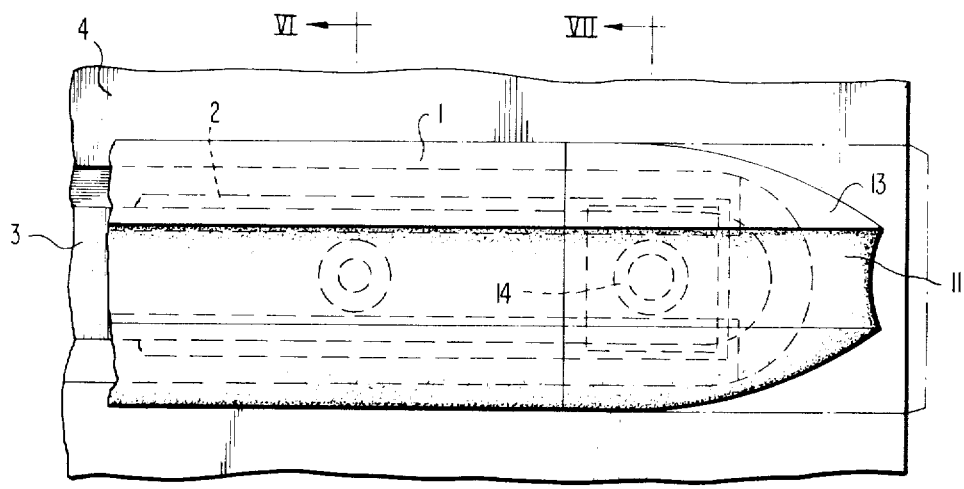
FIG. 4 is a partial side elevational view of a further embodiment of a protective strip in accordance with the present invention.
Figure 5:
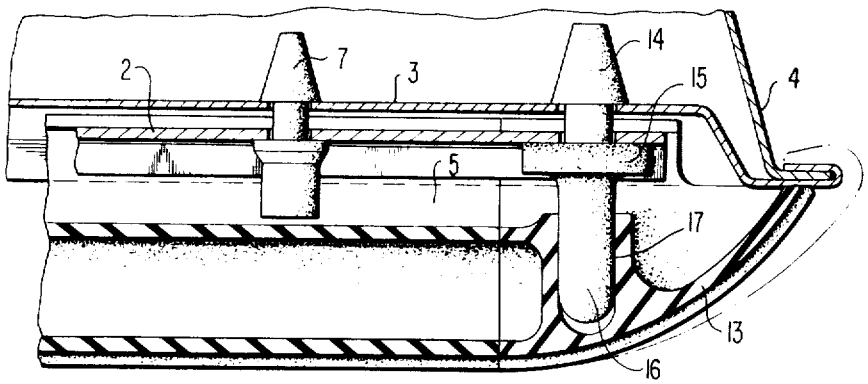
FIG. 5 is a horizontal longitudinal cross-sectional view through the embodiment according to FIG. 4.
Figure 6:
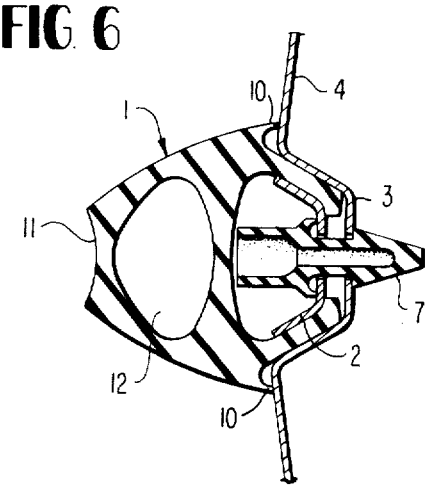
FIG. 6 is a cross-sectional view, taken along line VI—VI of FIG. 4.

The embodiment illustrated in FIGS. 4 – 6 corresponds essentially to the embodiment of FIGS. 1 – 3. Also in this embodiment an elastic profile generally designated by reference numeral 1 is secured in a groove-like recess 3 of the vehicle body covering 4 with the aid of a retaining or mounting profile 2 which is secured by means of elastic clips 7. The elastic profile 1 which also in this embodiment overlaps by means of sealing lips 10 the recess 3 at the top and bottom, possesses approximately the shape of a semi-elipse in cross section within the area disposed outside the recess 3 which semi-elipse is provided externally with a groove-like recess 11. The elastic profile possesses in this embodiment a relatively large hollow space 12 so that its elasticity is further increased in the outer area.

In order to be able to utilize an extruded elastic profile 1, separate end pieces 13 are provided which commence with a cross section corresponding to the contour of the elastic profile 1 and which then run out in the surface of the vehicle body covering 4. The recess 3 terminates shortly in front of the contact of the outer end of the end piece 13 on the vehicle body covering 4 as is illustrated, for example, in FIG. 5 by reference to a door of a motor vehicle. As is indicated in dash and dot lines in FIGS. 4 and 5, it is also possible to extend the end piece 13 up to the edge of the corresponding vehicle body covering part and to construct the same under certain circumstances in such a manner that it surrounds this edge.

Figure 7:
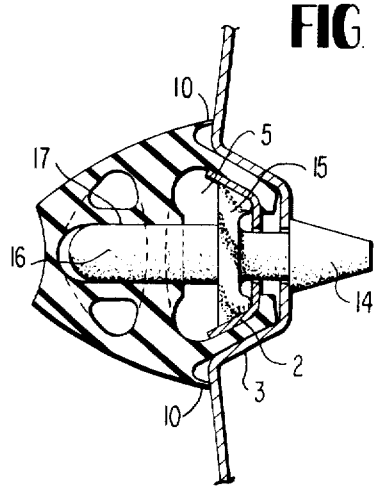
FIG. 7 is a cross-sectional view, taken along line VII—VII of FIG. 4.

It can be readily seen from FIG. 7 that the end piece 13 is provided in a similar manner as the elastic profile 1 with a dove-tail-shaped or C-shaped slot 5 on its side facing the vehicle body covering 4. It thus surrounds with its leg portions the retaining profile 2 in a similar manner as the elastic profile 1, by means of which it is, on the one hand, form-lockingly retained, and on the other, pressed against the walls of the recess 3.

The retaining profile 2 is secured within the area of the end piece 13 at the vehicle body covering 4 by means of a specially shaped clip 14 which also produces an elastic force. The abutment 15 of the clip 14 disposed on the outside of the retaining profile 2 possesses a diameter matched to the free cross section of the retaining profile 2 so that it is centered on this side at the retaining profile 2. Therebeyond, the clip 14 is extended bolt-like in the outward direction until near the outer edge of the elastic profile whereby the end piece 13 is placed over this bolt-like extension 16 with a corresponding guidance 17. In this manner, the end piece 13 is centered in all directions so that a completely satisfactory transition is created between the elastic profile and the end piece 13 also made of elastic material.

In the illustrated embodiments, the embossed or indented groove-like recess 3 of the vehicle body covering 4 has a trapezoidally shaped cross section. However, it is possible to impart thereto also any other configuration, for example, a triangularly shaped or round cross section while maintaining the same effect.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A protective strip for motor vehicles having a vehicle body covering provided with a recess having upper and lower walls which taper inwardly for accommodating the protective strip, the protective strip comprising: an elastic profile means, a longitudinal slot means provided in said profile means substantially along the entire length thereof, a substantially C-shaped cavity provided in said elastic profile means and defined by a pair of spaced leg portions disposed substantially parallel to the upper and lower walls of the recess provided in the body covering, said longitudinal slot means opening into said substantially C-shaped cavity, a retaining profile means receivable in said substantially C-shaped cavity and extending substantially along the entire length thereof, said retaining profile means consists of a bar U-shaped in cross section having spaced leg portions projecting in a direction away from the body covering and extending substantially parallel to the upper and lower walls of the inwardly tapering recess of the body covering so that a dove-tail-shaped construction results, said leg portions of said retaining profile means pressing said leg portions of said substantially C-shaped cavity against the walls of said recess, fastening means for fastening the retaining profile means of the protective strip to the body covering, and bore means provided in the retaining profile means for receiving said fastening means to secure the protective strip to the body covering.

2. A protective strip according to claim 1 wherein the bar constituting the retaining profile means is made of an elastic material. pg,14

3. A protective strip according to claim 2, wherein said fastening means includes clips which are extended outwardly beyond the leg portions of the bar.

4. A protective strip according to claim 1, wherein end pieces of elastic material which run out into the surface of the vehicle body covering adjoin the elastic profile means, at least one outwardly extended fastening means being inserted into a respective end piece.

5. A protective strip according to claim 1, wherein the elastic profile means surrounds the recess of the vehicle body covering at the top and bottom by sealing lips.

6. A protective strip according to claim 1 wherein the elastic profile means is provided between the slot means and an extension of the elastic profile means with a hollow space extending in the longitudinal direction to thereby increase the elasticity thereof.

7. A protective strip for motor vehicles having a vehicle body covering provided with a recess having upper and lower walls which taper inwardly for accommodating the protective strip, the protective strip comprising: an elastic profile means, a longitudinal slot means provided in said profile means substantially along the entire length thereof, a substantially C-shaped cavity provided in said elastic profile means and defined by a pair of spaced leg portions disposed substantially parallel to the upper and lower walls of the recess provided in the body covering, said longitudinal slot means opening into said substantially C-shaped cavity, a retaining profile means receivable in said substantially C-shaped cavity and extending substantially along the entire length thereof, said retaining profile means consists of a bar of an elastic material U-shaped in cross section having spaced leg portions projecting in a direction away from the body covering and extending substantially parallel to the upper and lower walls of the inwardly tapering recess of the body covering so that a dove-tail-shaped construction results, said leg portions of said retaining profile means pressing said leg portions of said substantially C-shaped cavity against the walls of said recess, fastening means made in one piece with the retaining profile means constituting said bar for fastening the retaining profile means of the protective strip to the body covering, said fastening means includes clips which are extended outwardly beyond the leg portions of the bar.

8. A protective strip according to claim 7, wherein end pieces of elastic material which run out into the surface of the vehicle body covering are provided and adjoin the elastic profile means, and wherein at least one outwardly extended fastening means is provided and inserted into a respective end piece.

9. A protective strip according to claim 7, wherein end pieces of elastic material which run out into the surface of the vehicle body covering are provided and adjoin the elastic profile means, and wherein at least one outwardly extended fastening means is provided and inserted into a respective end piece.

10. A protective strip according to claim 9, wherein the elastic profile means surrounds the recess of the vehicle body covering at the top and bottom by sealing lips.

11. A protective strip according to claim 10, wherein the elastic profile means is provided within the area adjoining the substantially C-shaped cavity with a hollow space extending in the longitudinal direction to thereby increase the elasticity thereof.

12. A protective strip according to claim 11, wherein the side of the elastic profile means facing away from the vehicle body covering is provided with a trapezoidally shaped bead, and wherein said hollow space is disposed in said bead.

13. A protective strip according to claim 12, wherein said at least one outwardly extended fastening means includes a means for centering the end pieces relative to the elastic profile means.

14. A protective strip according to claim 13, wherein said last mentioned means includes an abutment means provided on said fastening means and disposed between said retaining profile means and said elastic profile means, and an extension means receivable by said respective end pieces.

15. A protective strip according to claim 11, wherein said elastic profile means is approximately semi-elliptical in cross section, and wherein a groove-like recess is provided on the side of said elastic profile means facing away from the vehicle body covering.

16. A protective strip according to claim 15, wherein at least one outwardly extending fastening means includes a means for centering the end pieces relative to the elastic profile means.

17. A protective strip according to claim 16, wherein said lastmentioned means includes an abutment means provided on said fastening means and disposed between said retaining profile means and said elastic profile means, and an extension means receivable by said respective end pieces.

18. A protective strip for motor vehicles having a vehicle body covering provided with a recess having upper and lower walls which taper inwardly for accommodating the protective strip, the protective strip comprising: an elastic profile means, a longitudinal slot means provided in said profile means substantially along the entire length thereof, a substantially C-shaped cavity provided in said elastic profile means and defined by a pair of spaced leg portions disposed substantially parallel to the upper and lower walls of the recess provided in the body covering, said longitudinal slot means opening into said substantially C-shaped cavity, a retaining profile means receivable in said substantially C-shaped cavity and extending substantially along the entire length thereof, said retaining profile means consists of a bar of an elastic material U-shaped in cross section having spaced leg portions projecting in a direction away from the body covering and extending substantially parallel to the upper and lower walls of the inwardly tapering recess of the body covering so that a dove-tail-shaped construction results, said leg portions of said retaining profile means pressing said leg portions of said substantially C-shaped cavity against the walls of said recess, fastening means made in one piece with the retaining profile means constituting said bar for fastening the retaining profile means of the protective strip to the body covering.

* * * * *